US007803218B2

(12) United States Patent
Armstrong et al.

(10) Patent No.: US 7,803,218 B2
(45) Date of Patent: Sep. 28, 2010

(54) DRAIN VALVE ASSEMBLY

(75) Inventors: Bret D. Armstrong, Gilbert, AZ (US); Steven M. Perry, Fountain Hills, AZ (US); Anthony T. Matarazzo, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 885 days.

(21) Appl. No.: 11/678,803

(22) Filed: Feb. 26, 2007

(65) Prior Publication Data

US 2008/0202510 A1 Aug. 28, 2008

(51) Int. Cl.
*B01D 53/04* (2006.01)

(52) U.S. Cl. ............................ 96/121; 96/396; 55/432; 251/61.4

(58) Field of Classification Search .................. 96/121, 96/134, 396; 55/428, 430–432; 128/205.12, 128/205.27; 251/61–61.5; 137/505.36, 510
See application file for complete search history.

(56) References Cited

U.S. PATENT DOCUMENTS

| | | | | | |
|---|---|---|---|---|---|
| 571,833 | A | * | 11/1896 | Hunter | 251/61.4 |
| 2,414,629 | A | | 1/1947 | Bloss | |
| 2,625,178 | A | * | 1/1953 | Price | 251/61.4 |
| 2,747,681 | A | * | 5/1956 | Schuftan et al. | 96/122 |
| 3,052,444 | A | | 9/1962 | Kintner | |
| 3,290,003 | A | | 12/1966 | Kessler | |
| 3,968,812 | A | * | 7/1976 | Eross | 137/188 |
| 4,044,787 | A | * | 8/1977 | Sutherland | 137/107 |
| 4,248,188 | A | * | 2/1981 | Wilson et al. | 123/382 |
| 4,309,022 | A | | 1/1982 | Reinicke et al. | |
| 4,356,833 | A | | 11/1982 | Mayfield, Jr. et al. | |
| 4,463,774 | A | | 8/1984 | Gorges et al. | |
| 4,489,917 | A | | 12/1984 | Baumann | |
| 4,721,515 | A | * | 1/1988 | Hata et al. | 96/115 |
| 4,967,791 | A | | 11/1990 | Sternberger | |
| 4,983,190 | A | * | 1/1991 | Verrando et al. | 95/11 |
| 5,634,627 | A | | 6/1997 | Daido et al. | |
| 6,106,593 | A | * | 8/2000 | Golden et al. | 95/120 |
| 6,283,448 | B1 | | 9/2001 | Denton et al. | |

(Continued)

FOREIGN PATENT DOCUMENTS

EP 0882484 A 12/1998

(Continued)

OTHER PUBLICATIONS

EP Partial Search Report for EP 07 12 1237 mailed Nov. 2, 2009.

(Continued)

*Primary Examiner*—Frank M Lawrence
(74) *Attorney, Agent, or Firm*—Ingrassia Fisher & Lorenz, P.C.

(57) ABSTRACT

An on-board oxygen generating system is provided, which includes an air supply duct, a breathing gas duct, and an oxygen generator fluidly coupled between the air supply duct and the breathing gas duct. The oxygen generator is configured to enrich the oxygen content of air flowing from the air supply duct to the breathing gas duct. A drain valve assembly is fluidly coupled to the air supply duct and configured to move between: (i) an open position wherein condensation may drain from the air supply duct, and (ii) a closed position.

13 Claims, 3 Drawing Sheets

U.S. PATENT DOCUMENTS

| | | | |
|---|---|---|---|
| 6,923,183 B2 | 8/2005 | Martinez et al. | |
| 6,997,970 B2 | 2/2006 | Crome | |
| 7,155,896 B2 | 1/2007 | Jansen et al. | |
| 2003/0230196 A1* | 12/2003 | Kim | 96/4 |
| 2005/0045041 A1* | 3/2005 | Hechinger et al. | 96/121 |
| 2006/0060806 A1 | 3/2006 | Tanikawa et al. | |

FOREIGN PATENT DOCUMENTS

| | | |
|---|---|---|
| EP | 1 092 105 A | 4/2001 |

OTHER PUBLICATIONS

EP Search Report for EP 07 12 1237 mailed Jan. 22, 2010.

* cited by examiner

DRAIN VALVE ASSEMBLY

STATEMENT REGARDING FEDERALLY SPONSORED RESEARCH OR DEVELOPMENT

This invention was made with Government support under Contract No. N00019-02-C-3002 awarded by Lockheed Martin. The Government has certain rights in this invention.

FIELD OF THE INVENTION

The present invention relates to on-board oxygen generating systems (OBOGS) and, more specifically, to an OBOGS system including a drain valve assembly.

BACKGROUND

Aircraft on-board oxygen generating systems (OBOGS) have been developed for producing oxygen-enriched air that serves as breathing gas for one or more aircraft occupants (e.g., a pilot). The OBOGS includes an oxygen concentrator, which contains one or more particle beds commonly referred to as sieves. The sieves contain an adsorbent (e.g., zeolite) having a high affinity for nitrogen. As the OBOGS directs airflow through the oxygen concentrator, the sieves remove nitrogen from the air and the air's oxygen content is consequently increased. The resulting oxygen-enriched air is then routed to, for example, an oxygen breathing mask of the type worn by the pilot of a jet.

The air supplied to the OBOGS may be warm and moist. As this warm, moist air cools, condensation forms within the ducting of the OBOGS. Over time, this condensation may pools and wet the sieves. Wetting of the sieves may significantly degrade their performance. In addition, wetting may decrease the sieves' operational lifespan and, thus, require premature OBOGS unit replacement. It is thus desirable to prevent the wetting of the sieves by minimizing the formation or preventing the collection of condensation within the OBOGS.

Certain devices have been developed that may minimize the formation of condensation within the ducting of the OBOGS. For example, a cyclonic separation device may be employed that rotates the pressurized air flowing through the OBOGS at a high rate of speed. This causes the moisture droplets carried by the air to spiral into a tubular cyclone filter, which then removes the moisture from the OBOGS. While cyclonic separation devices of this type are fairly reliable at reducing air moisture content, the cyclone filter permits a substantial loss of pressurized air ("air leakage") during operation of the OBOGS, which negatively impacts the efficiency of the OBOGS system.

As an alternative to a cyclone separation device, a mixing valve may instead be employed within the OBOGS to minimize the formation of condensation. The mixing valve introduces hot, dry air from an upstream source into the warm, moist air entering the OBOGS. The hot, dry air mixes with the warm, moist air thereby reducing the moisture content thereof, consequently decreasing the formation of condensation within OBOGS ducting. Although such a mixing valve may effectively reduce the volume of collected condensation over a given period of time, the inclusion of such a mixing valve adds considerable weight and cost to the OBOGS system.

It should thus be appreciated that it would be desirable to provide an on-board oxygen generating system configured to minimize retained condensation. In particular, it would be desirable to provide a drain valve assembly that may be employed within an OBOGS that permits condensation to drain therefrom. Furthermore, it would be advantageous for such a drain valve assembly to automatically close when the OBOGS is activated so as to minimize the loss of pressurized air. Furthermore, other desirable features and characteristics of the present invention will become apparent from the subsequent detailed description of the invention and the appended claims, taken in conjunction with the accompanying drawings and this background of the invention.

BRIEF SUMMARY

An on-board oxygen generating system is provided, which includes an air supply duct, a breathing gas duct, and an oxygen generator fluidly coupled between the air supply duct and the breathing gas duct. The oxygen generator is configured to enrich the oxygen content of air flowing from the air supply duct to the breathing gas duct. A drain valve assembly is fluidly coupled to the air supply duct and configured to move between: (i) an open position wherein condensation may drain from the air supply duct, and (ii) a closed position.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
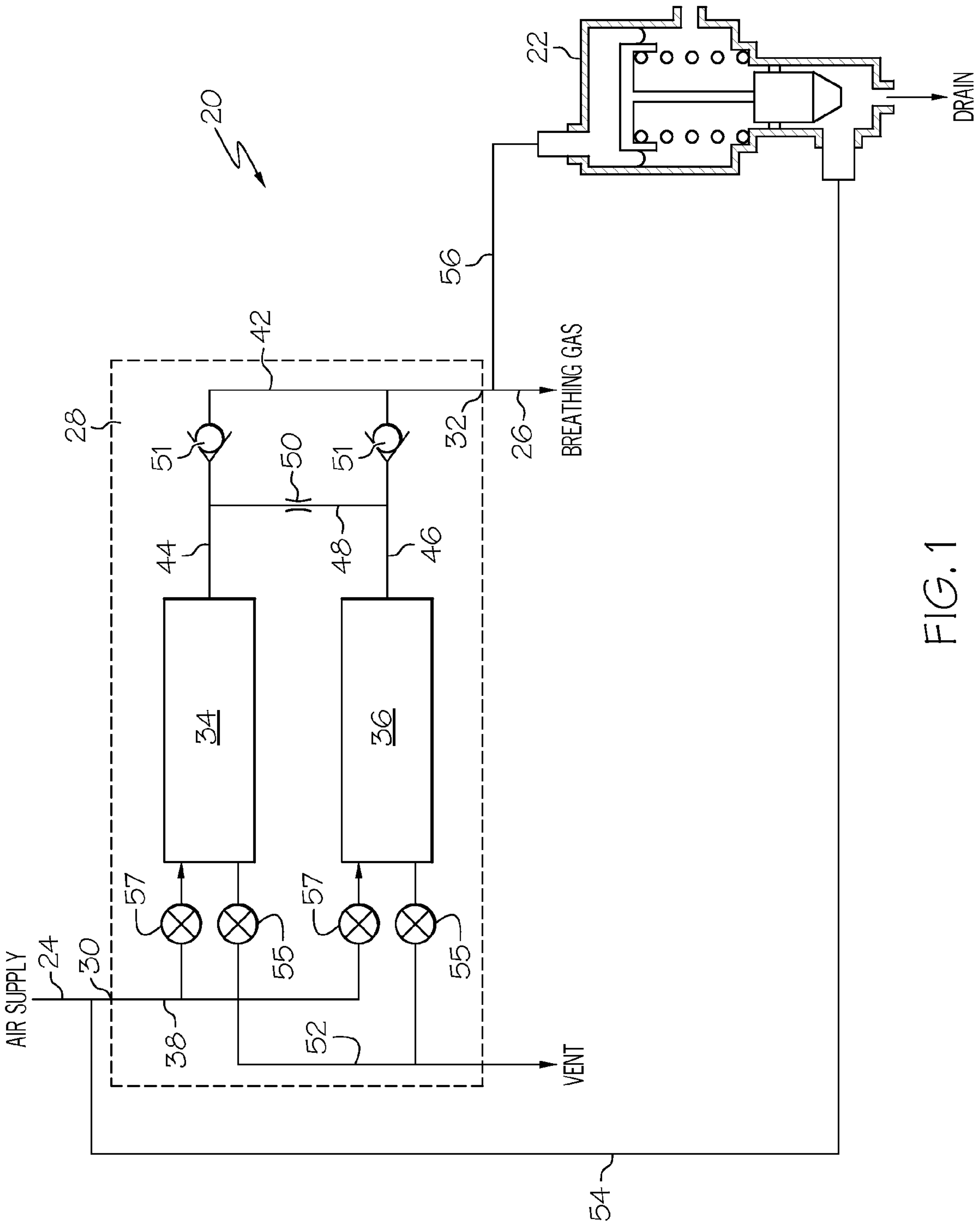
FIG. 1 is a schematic of an on-board oxygen generation system (OBOGS) including a drain valve assembly in accordance with an exemplary embodiment of the present invention.

FIG. 1 is a schematic of an on-board oxygen generating system (OBOGS) 20 including a drain valve assembly 22 in accordance with a first exemplary embodiment of the present invention. OBOGS 20 may be deployed on a high-altitude aircraft (e.g., a jet) and configured to provide one or more occupants (e.g., a pilot) with oxygen-enriched air. OBOGS 20 includes an air supply duct 24, a breathing gas duct 26, and an oxygen concentrator 28. Air supply duct 24 receives air from an outside source. This air may be pressurized and supplied to air supply duct 24 by a conventional power thermal management system (PTMS), which manages the aircraft's electrical and pneumatic systems in the well-known manner. Oxygen concentrator 28 receives the pressurized air flowing through air supply duct 24 at concentrator inlet 30. When activated, oxygen concentrator 28 enriches the oxygen content of the pressurized air and delivers the oxygen-enriched air to breathing gas duct 26 through concentrator outlet 32. Breathing gas duct 26 then supplies the oxygen-enriched air to one or more aircraft occupants. For example, breathing gas duct 26 may route the oxygen-enriched air to the oxygen breathing mask worn by a jet pilot.

For the purposes of the present invention, oxygen concentrator 28 may comprise any device suitable for enriching the oxygen content of the pressurized air received from air supply duct 24. In the illustrated exemplary embodiment, in particular, oxygen concentrator 28 includes first and second particle beds, or sieves, 34 and 36. Sieves 34 and 36 are each fluidly coupled to concentrator inlet 30, and thus to air supply duct 24, by way of a bifurcated inlet passageway 38. Sieves 34 and 36 each contain an adsorbent (e.g., clay-bound activated zeolite), which chemically binds nitrogen while permitting oxygen and other inert gases (e.g., argon) to flow therethrough. Thus, as the pressurized air flows through sieves 34 and 36, the relative oxygen content of the air increases to, for example, 60 to 90 percent. The oxygen-enriched air then exits sieves 34 and 36 through a bifurcated outlet passageway 42, which is fluidly coupled to concentrator outlet 32. Bifurcated outlet passage 42 includes first and second legs 44 and 46, which may be coupled to sieves 34 and 36, respectively. To permit cross-flow, legs 44 and 46 may be connected by way of a passageway 48. A flow restrictor 50 may be coupled to passageway 48 as indicated in FIG. 1 to prevent the cross-flow pressure from exceeding a predetermined threshold. In addition, legs 44 and 46 may each include a check or non-return valve 51, which prevents the backflow of the oxygen-enriched air flowing through outlet passageway 42.

A bifurcated vent passageway 52 fluidly couples each of sieves 34 and 36 to a vent (e.g., an ambient pressure source). Two solenoid valves 55 are coupled to bifurcated vent passageway 52. Similarly, two solenoid valves 57 are coupled to bifurcated inlet passageway 38. During the operation of oxygen concentrator 28, solenoid valves 55 and 57 cycle open and shut such that one sieve enriches the oxygen content of air flowing from inlet passageway 38 to outlet passageway 42, while the other sieve routes pressurized air from inlet passageway 38 to vent passageway 52 in a self-cleaning process. For example, while sieve 34 may receive air from inlet passageway 38 and deliver oxygen-enriched air to leg 44 of outlet passageway 42, sieve 36 may route pressurized air from inlet passageway 38 to vent passageway 52. In this manner, oxygen concentrator 28 may maintain the optimal performance of sieves 34 and 36 while continually supplying oxygen-enriched air to breathing gas duct 26.

During the operation of OBOGS 20, warm air having a relatively high moisture content may be drawn in to air supply duct 24. As this air cools, condensation may form within the ducting of OBOGS 20 (e.g., on the interior surface of air supply duct 24). As explained above, the effectiveness and/or operational lifespan of sieves 34 and 36 may be significantly decreased if the condensation is permitted to pool and wet sieves 34 and 36. Thus, to prevent the wetting of sieves 34 and 36, OBOGS 20 is equipped with a drain valve assembly 22. Drain valve assembly 22 may be fluidly coupled to the ducting of OBOGS 20. For example, as illustrated in FIG. 1, drain valve assembly 22 may be fluidly coupled to air supply duct 24 by way of a pneumatic passageway 54. In addition, drain valve assembly 22 may be fluidly coupled to breathing gas duct 26 by way of a control pressure passageway 56. When drain valve assembly 22 is in an open position, condensation may drain from air supply duct 24 and air may flow therethrough. In contrast, when drain valve assembly 22 is in a closed position, condensation does not drain from air supply duct 24 and pressurized air does not flow therethrough. As described below in more detail, drain valve assembly 22 is preferably configured to remain in the open position when OBOGS 20 is inactive to permit the drainage of condensation from air supply duct 24. When OBOGS 20 is activated, drain valve assembly 22 preferably moves to a closed position to minimize the leakage of pressurized air and thereby maintain the optimal performance of OBOGS 20. To this end, drain valve assembly 22 may be configured to automatically transition to its closed state when the pressure of the air flowing through breathing gas duct 26, and thus through control pressure passageway 56, reaches a predetermined threshold pressure as described more fully below.

Figure 2:
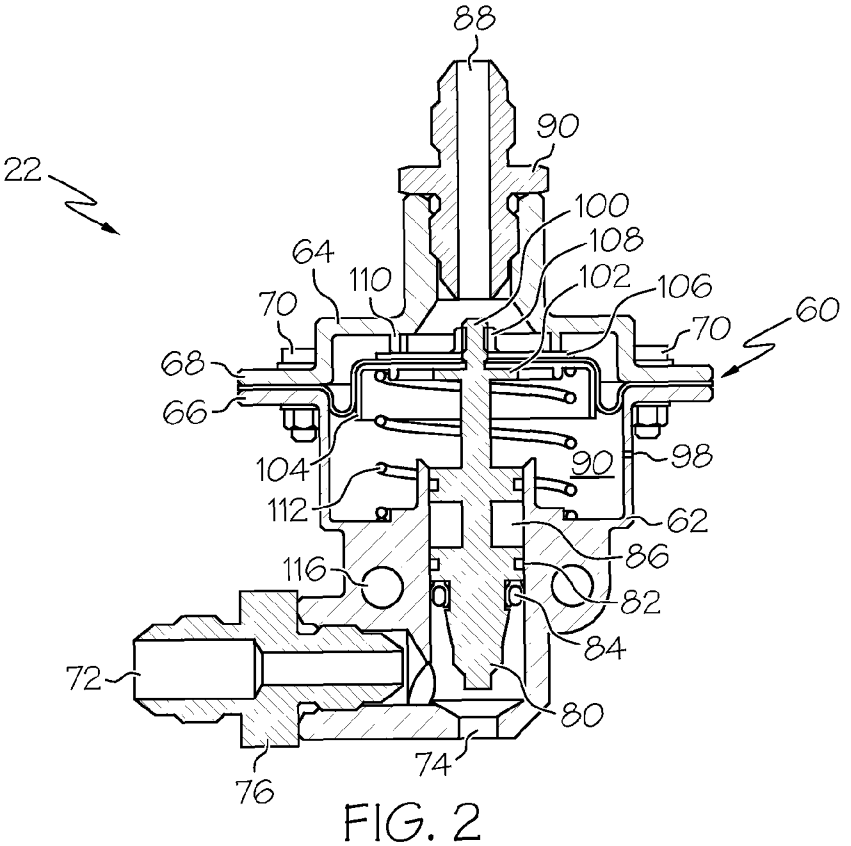
FIGS. 2 and 3 are cross-sectional views of the drain valve assembly shown in FIG. 1 in open and closed states, respectively.
Figure 3:
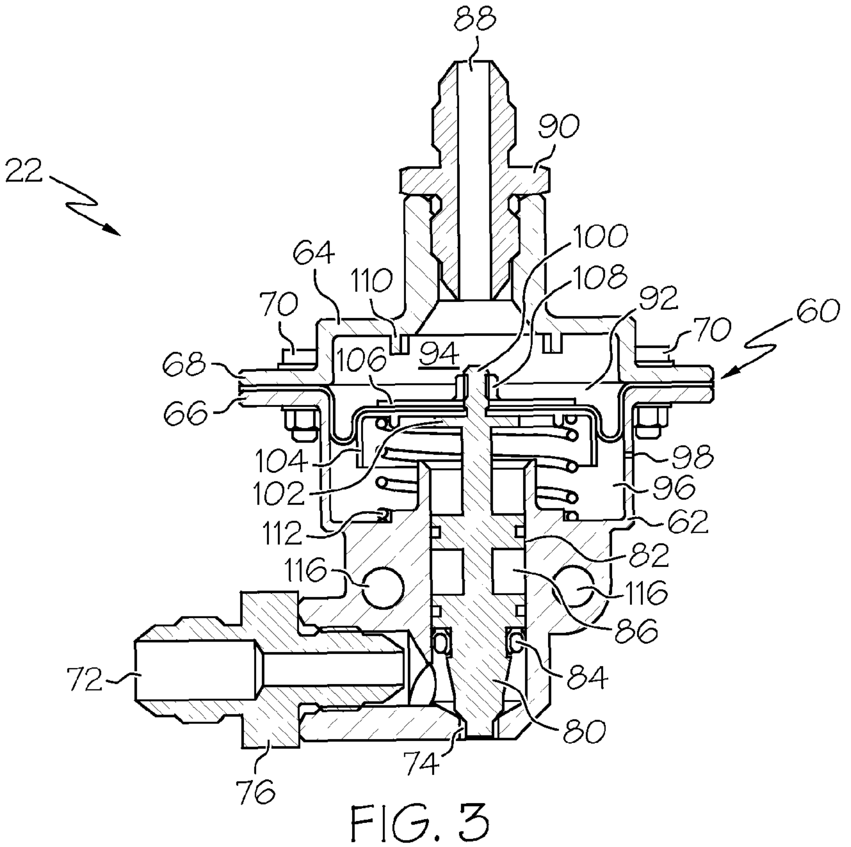
Figure 4:
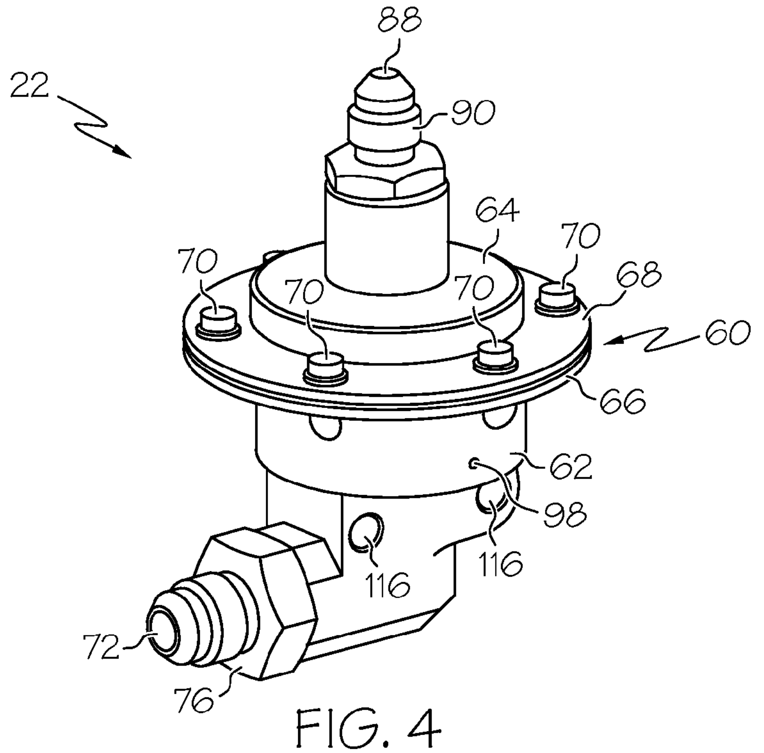
FIG. 4 is an isometric view of the drain valve assembly shown in FIGS. 1-3.

FIGS. 2 and 3 are cross-sectional views of exemplary drain valve assembly 22 in open and closed states, respectively, and FIG. 4 is an isometric view of drain vale assembly 22. Drain valve assembly 22 comprises a drain valve assembly housing 60, which includes a housing body 62 and a cover 64. Housing body 62 may include a housing body flange 66, and cover 64 may likewise include a cover flange 68. As most clearly shown in FIG. 4, housing body 62 may be removably attached to cover 64 by way of a plurality of fasteners (e.g., bolts) 70 extending through cover flange 68 and housing body flange 66. During the operation of drain valve assembly 22, housing body 62 may be routinely exposed to condensation; thus, housing body 62 is preferably made of a metal or alloy that is resistant to corrosion (e.g., stainless steel). Cover 64, which is not routinely exposed to condensation, is preferably made of a lightweight metal or alloy (e.g., aluminum).

A moisture inlet 72 and a moisture outlet 74 are provided in housing body 62 of drain valve assembly housing 60. A fitting 76 may be coupled to moisture inlet 72 to facilitate the attachment of, for example, a flexible hosing. A valve 80 is mounted within drain valve assembly housing 60 and movable between (i) an open position wherein moisture may flow from moisture inlet 72 to moisture outlet 74, and (ii) a closed position. As indicated in the illustrated exemplary embodiment, drain valve assembly 22 is preferably a poppet-type valve assembly, and valve 80 is preferably a plug or plunger and will thus be referred to as such herein. This example notwithstanding, it should be understood that drain valve assembly 22 and valve 80 may assume any form suitable for selectively draining condensation from OBOGS 20 (e.g., a butterfly valve assembly and a butterfly valve plate, respectively).

Plunger 80 may be slidably coupled to housing body 62 of housing 60. In particular, plunger 80 may be disposed within a tubular channel 82 provided within housing body 62. To prevent pressurized airflow through channel 82, the outer diameter of plunger 80 may be substantially equivalent to the inner diameter of channel 82, and a seal 84 (e.g., a spring-loaded omni-seal) may be disposed around portion of plunger 80 and sealingly engage an inner surface of channel 82. When plunger 80 descends into the closed position (FIG. 3), a first end portion (i.e., the head) of plunger 80 plugs moisture outlet 74 thus obstructing the flow of condensation and pressurized air therethrough. If desired, the head of plunger 80 may be tapered as shown in FIGS. 2 and 3 to form a better seal with moisture outlet 74. In addition, plunger 80 may include one or more cutouts 86 to decrease the overall weight of drain valve assembly 22. Plunger 80 is preferably made of corrosion resistant metal or alloy, such as stainless steal.

A control pressure inlet 88 is provided through cover 64. A fitting 90 may be coupled to inlet 88 to facilitate the attachment of, for example, a flexible hosing, which may form pneumatic passageway 56 (FIG. 1). Control pressure inlet 88 fluidly communicates with a flexible diaphragm 92 disposed within drain valve assembly housing 60. The peripheral portion of flexible diaphragm 92 may be held between cover flange 68 and housing body flange 66, while the inner portion of flexible diaphragm may flex upward or downward within drain valve assembly housing 60. Flexible diaphragm 92 cooperates with cover 64 to form a control pressure chamber 94 (FIG. 3), which is fluidly coupled to control pressure inlet 88. In a similar manner, flexible diaphragm 92 cooperates with housing body 62 to form a vented chamber 96, which is fluidly coupled to a low pressure source (e.g., ambient pressure) by way of an aperture 98 provided through a wall housing body 62.

Plunger 80 includes a second end portion 100, which may have an area of enlarged outer diameter (e.g., an annular collar) 102. A diaphragm cup 104 (e.g., stainless steel), which helps to guide the movement of diaphragm 92, may be disposed between collar 102 and the underside of diaphragm 92. A washer 106 is threaded over end portion 100 of plunger 80. Washer 106 may be held against an upper surface of diaphragm 92 by a nut 108, which may be threadably coupled to end portion 100. In this manner, end portion 100 may be attached to flexible diaphragm 92 such that plunger 80 may move between its open and closed positions as diaphragm 92 flexes upward and downward, respectively. In the open position (FIG. 2), washer 106 abuttingly engages stop features 110 provided within cover 64. In the closed position (FIG. 3), the head of plunger 80 abuttingly engages the walls of moisture outlet 74.

A spring 112 may be disposed within vented chamber 96. The first end of spring 112 may contact an inner portion of housing body 62, and the second end of spring 112 may contact the underside of diaphragm cup 104. Spring 112 biases diaphragm 92 toward the upward position shown in FIG. 2, which corresponds to the open position of plunger 80. As a result, plunger 80 normally resides within the open position (FIG. 2) until the pressure within control pressure chamber 94 surpasses a predetermined pressure threshold. At this threshold, the pressure within control pressure chamber 94 forces diaphragm 92, and thus plunger 80, downward toward the closed position, and spring 112 is compressed between diaphragm cup 104 and an inner surface of housing body 62.

As indicated above, drain valve assembly 22 may be configured to automatically close and minimize the loss of pressurized air when OBOGS 20 is activated. As explained previously, control pressure chamber 94 may be fluidly coupled to breathing gas duct 26 by way of passageway 54 (FIG. 1). When OBOGS 20 is activated and oxygen generator 28 introduces oxygen-enriched air into breathing gas duct 26, the pressure within control pressure chamber 94 increases to the threshold pressure. This causes diaphragm 92 to flex downward and plunger 80 to move to the closed position (FIG. 3). When OBOGS 20 is later deactivated, spring 112 expands to return diaphragm 92 and plunger 80 to the open position (FIG. 2) thereby permitting condensation to drain through drain valve assembly 22 when, for example, the aircraft is grounded. Drain valve assembly 22 remains in the open position until OBOGS 20 is again activated. In this manner, drain valve assembly 22 may be configured to transition between its open and closed states as OBOGS 20 is activated and deactivated, respectively, without the need for an externally controlled actuator.

Figure 5:
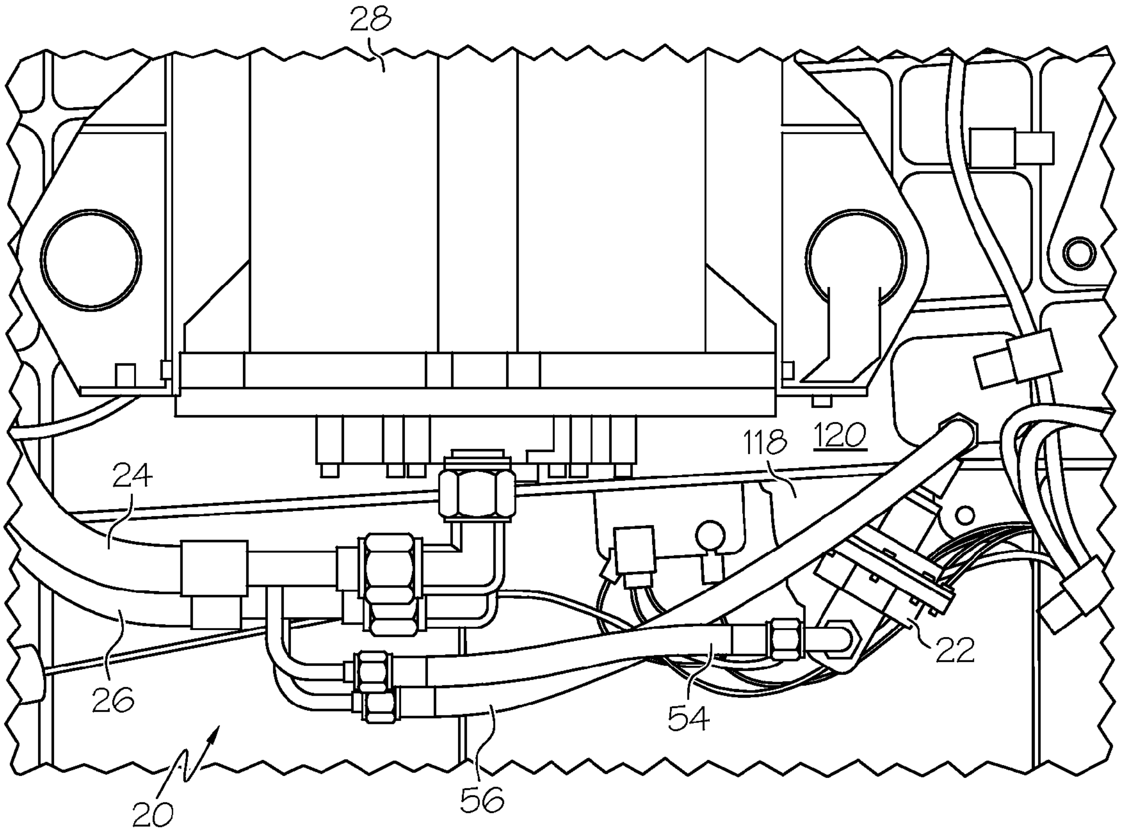
FIG. 5 is an isometric view of the drain valve assembly shown in FIGS. 1-4 illustrating one manner in which the drain valve assembly may be mounted to an airframe.

Drain valve assembly 22 may include one or more mounting features. For example, as shown in FIGS. 2-4, drain valve assembly 22 may include first and second clearance holes 116 sized to receive a fastener, such as a bolt. As shown in FIG. 5, drain valve assembly 22 may be attached to a mounting bracket 118, which, in turn, may be mounted to an airframe 120. To promote drainage, drain valve assembly 22 is preferably positioned at a low point relative to the ducting of OBOGS 20. In addition, drain valve assembly 22 is preferably mounted in tilted position. For example, as indicated in FIG. 5, drain valve assembly 22 may be mounted such that longitudinal axis of assembly 22 is approximately 30 degrees from vertical.

In view of the above, it should be appreciated that an on-board oxygen generation system has been provided that minimizes retained condensation. In addition, it should be appreciated that a drain valve assembly has been provided that may be employed within such an OBOGS, which permits the drainage of condensation while minimizing the loss of pressurized air during the OBOGS operation. Of course, it should be understood that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An on-board oxygen generating system for deployment onboard an aircraft, the on-board oxygen generating system comprising:

an air supply duct;

a breathing gas duct configured to supply breathing gas to at least one occupant of the aircraft;

an oxygen generator fluidly coupled between said air supply duct and said breathing gas duct, said oxygen generator configured to enrich the oxygen content of air flowing from said air supply duct to said breathing gas duct; and a drain valve assembly fluidly coupled to said air supply duct and to said breathing gas duct, said drain valve assembly configured to move from an open position wherein condensation may drain from said air supply duct to a closed position when the pressure within said breathing gas duct surpasses a predetermined pressure threshold.

2. An on-board oxygen generating system according to claim 1 wherein said drain valve assembly is configured to reside in the open position when the on-board oxygen generating system is inactive.

3. An on-board oxygen generating system according to claim 2 wherein said drain valve assembly is configured to move into the closed position when the on-board oxygen generating system is activated.

4. An on-board oxygen generating system according to claim 1 further comprising an airframe, said drain valve assembly mounted to said airframe in a tilted position.

5. An on-board oxygen generating system according to claim 1 wherein said drain valve assembly comprises:

a housing including a moisture inlet fluidly coupled to said air supply duct, a moisture outlet, and a control pressure inlet; and a valve mounted in said housing and movable between (i) an open position wherein moisture received at said moisture inlet drains through said moisture outlet, and (ii) a closed position.

6. An on-board oxygen generating system according to claim 5 wherein said control pressure inlet is fluidly coupled to said breathing gas duct.

7. An on-board oxygen generating system, comprising:

an air supply duct;

a breathing gas duct;

an oxygen generator fluidly coupled between said air supply duct and said breathing gas duct, said oxygen generator configured to enrich the oxygen content of air flowing from said air supply duct to said breathing gas duct; and a drain valve assembly, comprising:

a housing including a control pressure inlet fluidly coupled to said breathing gas duct, a control pressure inlet, a moisture inlet fluidly coupled to said air supply duct, and a moisture outlet;

a valve disposed within said housing and movable between (i) an open position wherein moisture received at said moisture inlet drains through said moisture outlet, and (ii) a closed position; and a diaphragm coupled to said valve and in fluid communication with said control pressure inlet, said diaphragm configured to move said valve to the closed position when the air flowing through said control pressure inlet surpasses a predetermined pressure threshold.

8. An on-board oxygen generating system according to claim 7 wherein said drain valve assembly is positioned at a low point relative to said air supply duct.

9. An on-board oxygen generating system according to claim 7 wherein said drain valve assembly further comprises a spring disposed within said housing and biasing said diaphragm toward a position corresponding to the open position of said valve.

10. An on-board oxygen generating system according to claim 7 wherein said housing comprises:

a housing body; and a cover coupled to said housing body, said diaphragm held between said housing body and said cover.

11. An on-board oxygen generating system according to claim 10 wherein said cover and said diaphragm cooperate to form a control pressure chamber in fluid communication with said control pressure inlet and said breathing gas duct.

12. An on-board oxygen generating system according to claim 10 wherein said housing body and said diaphragm cooperate to form a chamber in fluid communication with an ambient pressure source.

13. An on-board oxygen generating system, comprising:

an air supply duct;

a breathing gas duct;

an oxygen generator fluidly coupled between said air supply duct and said breathing gas duct, said oxygen generator configured to enrich the oxygen content of air flowing from said air supply duct to said breathing gas duct; and a drain valve assembly, comprising:

a housing including a moisture inlet fluidly coupled to said air supply duct, a moisture outlet, and a control pressure inlet fluidly coupled to said breathing gas duct; and a valve mounted in said housing and movable between (i) an open position wherein moisture received at said moisture inlet drains through said moisture outlet, and (ii) a closed position.

* * * * *